United States Patent
Fang et al.

(10) Patent No.: US 6,659,431 B1
(45) Date of Patent: Dec. 9, 2003

(54) FLUID TREATMENT SYSTEM AND CLEANING APPARATUS THEREFOR

(75) Inventors: Gang Fang, North York (CA); Yuri Lawryshyn, Komoka (CA); Jan M. Maarschalkerweerd, Mount Brydges (CA); Douglas Penhale, London (CA)

(73) Assignee: Trojan Technologies, Inc. (CA)

( * ) Notice: Subject to any disclaimer, the term of this patent is extended or adjusted under 35 U.S.C. 154(b) by 0 days.

(21) Appl. No.: 10/049,378
(22) PCT Filed: Aug. 11, 2000
(86) PCT No.: PCT/CA00/00915
§ 371 (c)(1),
(2), (4) Date: Feb. 12, 2002
(87) PCT Pub. No.: WO01/12560
PCT Pub. Date: Feb. 22, 2001

Related U.S. Application Data
(60) Provisional application No. 60/148,648, filed on Aug. 13, 1999.

(51) Int. Cl.[7] .................................................. G01N 21/75
(52) U.S. Cl. ....................... 256/431; 250/436; 250/438; 422/186.3; 422/24; 422/906
(58) Field of Search .................................. 250/431, 436, 250/438; 422/186.3, 24, 906

(56) References Cited

U.S. PATENT DOCUMENTS 5,418,370 A * 5/1995 Maarschalkerweerd ..... 250/431
5,874,740 A * 2/1999 Ishiyama ..................... 250/431
RE36,896 E * 10/2000 Maarschalkerweerd .. 422/186.3

FOREIGN PATENT DOCUMENTS

EP         0 743 105 A1    11/1996

OTHER PUBLICATIONS

Wang et al. "Tube Scrapper", Pub. No: US 2002/0032659 A1 of Oct. 25, 2001.*

* cited by examiner

Primary Examiner—John R. Lee
Assistant Examiner—Zia R. Hashmi
(74) Attorney, Agent, or Firm—Katten Muchin Zavis Rosenman

(57) ABSTRACT

A cleaning apparatus for use in a fluid treatment system comprising a radiation source assembly, the cleaning apparatus comprising: at least one cleaning sleeve (300) in sliding engagement with the exterior of the radiation source assembly (150); a cleaning chamber (310) disposed in the at least one cleaning sleeve in contact with a portion of the exterior of the radiation source assembly (150) and for being supplied with a cleaning solution, the cleaning chamber comprising an opening (370) to an exterior of the cleaning sleeve; a pressure equalization member (355) disposed in the opening to provide a seal between the opening and the exterior of the cleaning sleeve, the pressure equalization member being movable in response to a pressure gradient thereacross; and drive means to translate the at least one cleaning sleeve along the exterior of the radiation source assembly. A fluid treatment device comprise the cleaning apparatus is also described.

29 Claims, 3 Drawing Sheets

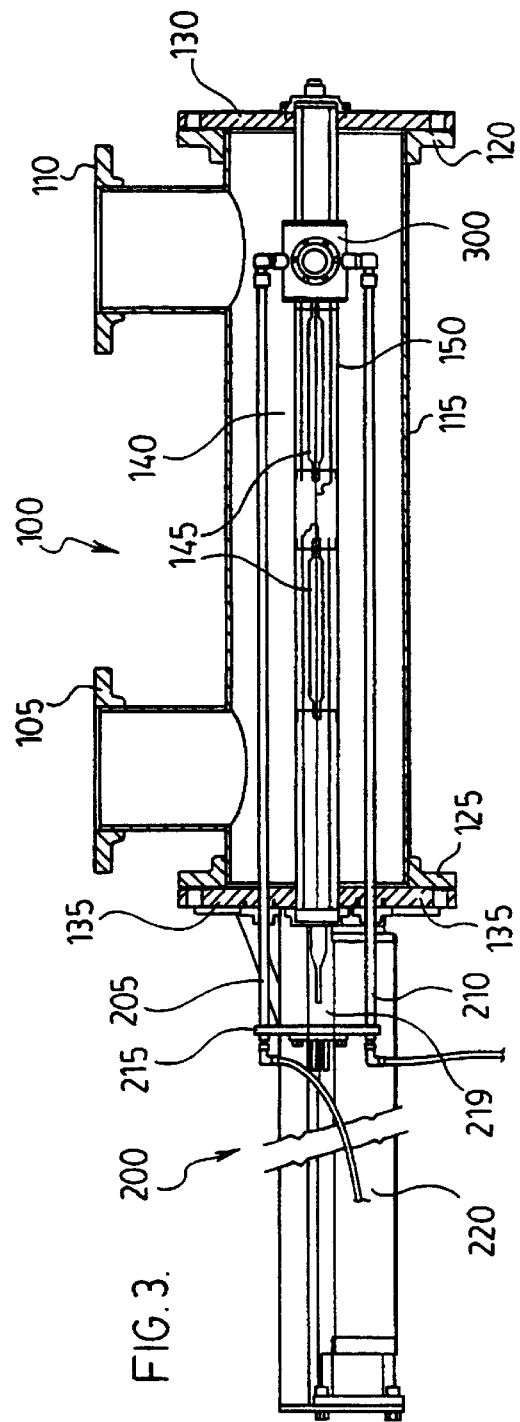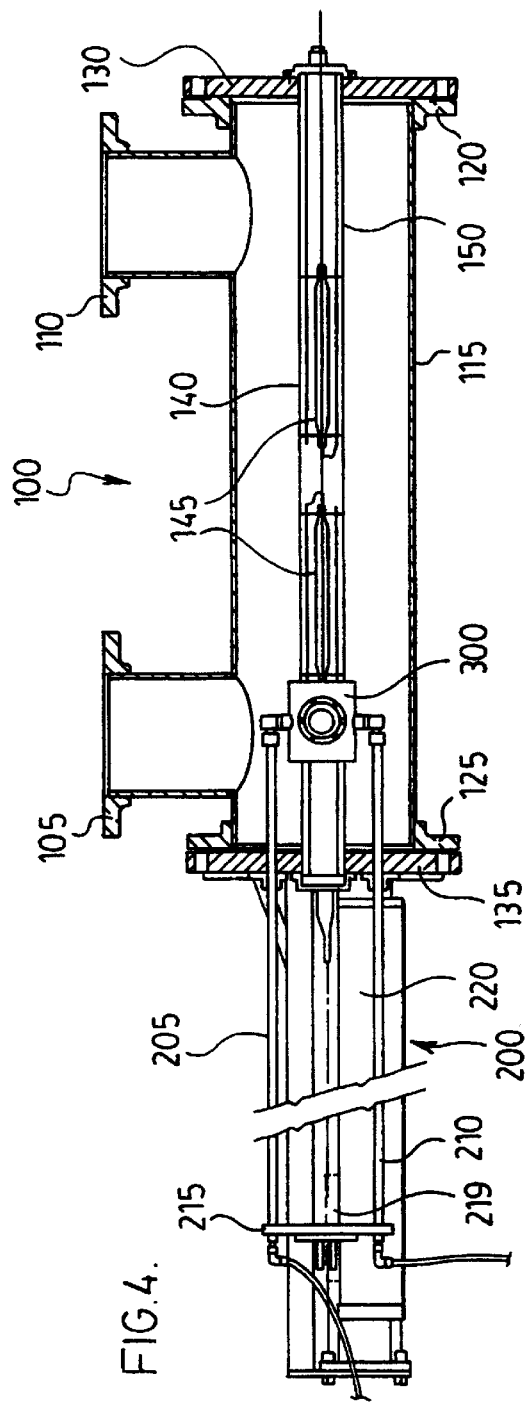

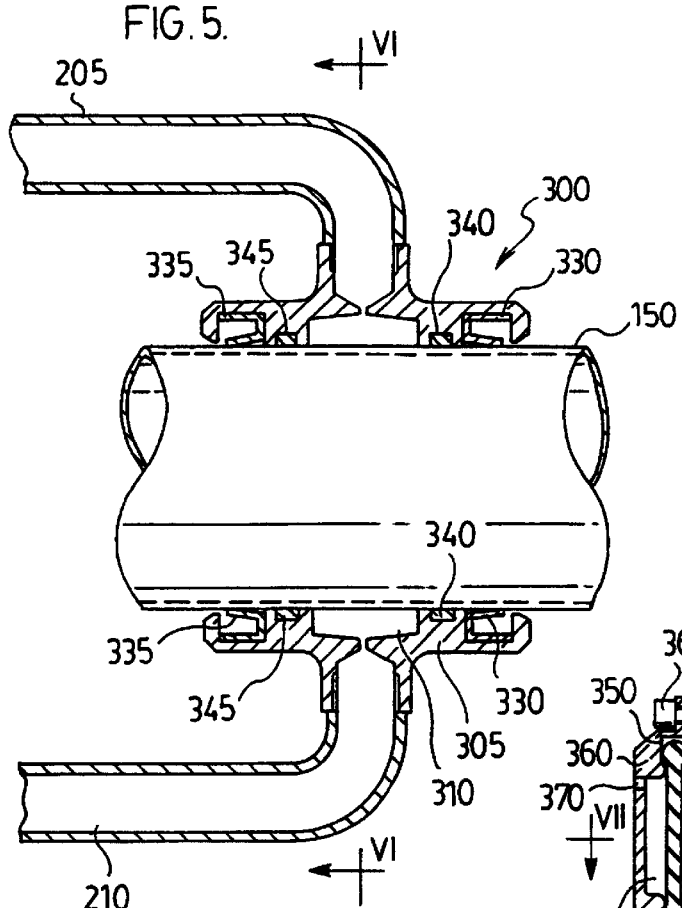
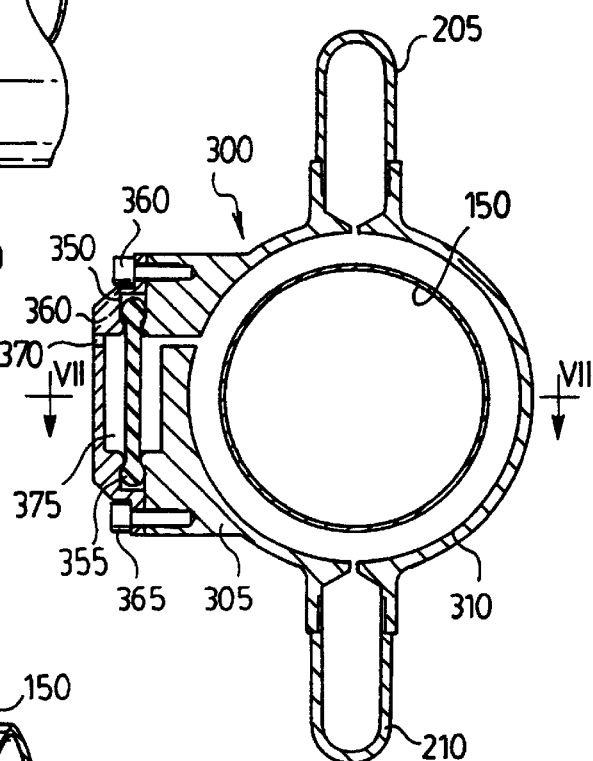
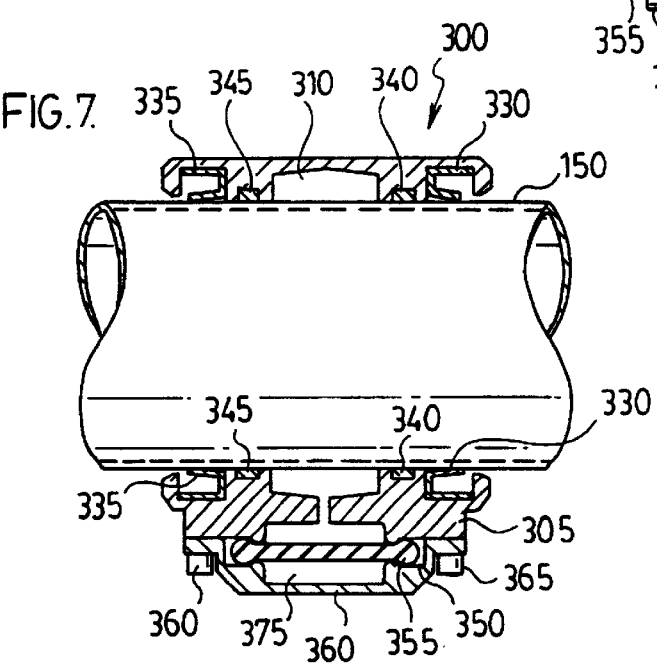

FLUID TREATMENT SYSTEM AND CLEANING APPARATUS THEREFOR

This application claims the benefit of provisional application No. 60/148,648 filed Aug. 13, 1999.

TECHNICAL FIELD

In one of its aspects, the present invention relates to a cleaning apparatus for use in a fluid treatment system. In another of its aspects, the present invention relates to a fluid treatment system comprising the cleaning apparatus.

BACKGROUND ART

Fluid treatment systems are known generally in the art.

For example, U.S. Pat. Nos. 4,482,809, 4,872,980 and 5,006,244 (all in the name of Maarschalkerweerd and all assigned to the assignee of the present invention and hereinafter referred to as the Maarschalkerweerd #1 Patents all describe gravity fed fluid treatment systems which employ ultraviolet (UV) radiation.

Such systems include an array of UV lamp frames which include several UV lamps each of which are mounted within sleeves which extend between and are supported by a pair of legs which are attached to a cross-piece. The so-supported sleeves (containing the UV lamps) are immersed into a fluid to be treated which is then irradiated as required. Depending upon the quality of the fluid which is being treated, the sleeves surrounding the UV lamps periodically become fouled with foreign materials, inhibiting their ability to transmit UV radiation to the fluid. For a given installation, the occurrence of such fouling may be determined from historical operating data or by measurements from the UV sensors. Once fouling has reached a certain point, the sleeves must be cleaned to remove the fouling materials and optimize system performance.

If the UV lamp modules are employed in an open, channel-like system (e.g., such as the one described and illustrated in Maarschalkerweerd #1 Patents), one or more of the modules may be removed while the system continues to operate, and the removed frames may be immersed in a bath of suitable cleaning solution (e.g., a mild acid) which may be air-agitated to remove fouling materials. Of course, this necessitates the provision of surplus or redundant sources of UV radiation (usually by including extra UV lamp modules) to ensure adequate irradiation of the fluid being treated while one or more of the frames has been removed for cleaning. This required surplus UV capacity adds to the capital expense of installing the treatment system. Further, a cleaning vessel for receiving the UV lamp modules must also be provided and maintained. Depending on the number of modules which must be serviced for cleaning at one time and the frequency at which they require cleaning, this can also significantly add to the expense of operating and maintaining the treatment system. Furthermore, this cleaning regimen necessitates relatively high labour costs to attend to the required removal/re-installation of modules and removal/refilling of cleaning solution in the cleaning vessel. Still further, such handling of the modules results in an increased risk of damage to or breakage of the lamps in the module.

U.S. Pat. Nos. 5,418,370, 5,539,210 and 5,590,390 (all in the name of Maarschalkerweerd and all assigned to the assignee of the present invention and hereinafter referred to as the Maarschalkerweerd #2 Patents) all describe an improved cleaning system, particularly advantageous for use in gravity fed fluid treatment systems which employ UV radiation. Generally, the cleaning system comprises a cleaning sleeve engaging a portion of the exterior of a radiation source assembly including a radiation source (e.g., a UV lamp). The cleaning sleeve is movable between: (i) a retracted position wherein a first portion of radiation source assembly is exposed to a flow of fluid to be treated, and (ii) an extended position wherein the first portion of the radiation source assembly is completely or partially covered by the cleaning sleeve. The cleaning sleeve includes a chamber in contact with the first portion of the radiation source assembly. The chamber is supplied with a cleaning solution suitable for removing undesired materials from the first portion of the radiation source assembly.

The cleaning system described in the Maarschalkerweerd #2 Patents represents a significant advance in the art, especially when implemented in the radiation source module and fluid treatment system illustrated in these patents. However, there is still room for improvement.

For example, implementation of the cleaning system described in the Maarschalkerweerd #2 Patents can, in some cases, be problematic, particularly in pressurized fluid treatment systems—e.g., in a fluid treatment system wherein flow of fluid has a pressure of at least 5 psi greater than the pressure of the cleaning fluid in the cleaning chamber. As will be described in more detailed hereinbelow, use of a conventional O-ring sealing arrangement as taught by the Maarschalkerweerd #2 Patents can result in catastrophic failure of the seals. While, in the past, this may not have been a significant problem in municipal wastewater treatment applications (i.e., after treatment, the fluid is then discharged into a stream, creek, river, lake or other body of water), more stringent environmental regulations are now encouraging the search for a solution to the problem. Also, clean water treatment systems present a unique set of challenges since the fluid being treated in the system is a source of potable/drinking water. If the cleaning system described in the Maarschalkerweerd #2 Patents were implemented in a pressurized clean water treatment system, there would be a likelihood of leakage of the cleaning solution from the chamber into the fluid being treated. Alternatively, there would be a likelihood of leakage of the fluid being treated into the cleaning system. It is desirable to avoid such leakage of cleaning solution to or from the cleaning system.

Thus, notwithstanding the advances in the art provided by the cleaning system taught in the Maarschalkerweerd #2 Patents, there remains a need in the art for a cleaning apparatus which may be implemented advantageously, inter alia, in a clean water treatment system.

DISCLOSURE OF THE INVENTION

It is an object of the invention to provide a cleaning system which obviates or mitigates at least one of the above-mentioned disadvantages of the prior art.

Accordingly, in one of its aspects, the present invention provides a cleaning apparatus for use in a fluid treatment system comprising a radiation source assembly, the cleaning apparatus comprising:

at least one cleaning sleeve in sliding engagement with the exterior of the radiation source assembly;

a cleaning chamber disposed in the at least one cleaning sleeve in contact with a portion of the exterior of the radiation source assembly and for being supplied with a cleaning solution, the cleaning chamber comprising an opening to an exterior of the cleaning sleeve;

a pressure equalization member disposed in the opening to provide a seal between the opening and the exterior of the cleaning sleeve, the pressure equalization member being moveable in response to a pressure gradient thereacross; and drive means to translate the at least one cleaning sleeve along the exterior of the radiation source assembly.

In another of its aspects, the present invention provides, a fluid treatment device comprising a housing for receiving a flow of fluid, the housing comprising:

a fluid inlet;

a fluid outlet;

a fluid treatment zone disposed between the fluid inlet and the fluid outlet;

a radiation source assembly disposed in the fluid treatment zone for treatment of the flow of fluid; and a cleaning apparatus comprising: at least one cleaning sleeve in sliding engagement with the exterior of the radiation source assembly; a cleaning chamber disposed in the at least one cleaning sleeve in contact with a portion of the exterior of the radiation source assembly and for being supplied with a cleaning solution, the cleaning chamber comprising an opening to an exterior of the cleaning sleeve; a pressure equalization member disposed in the opening to provide a seal between the opening and the exterior of the cleaning sleeve, the pressure equalization member being moveable in response to a pressure gradient thereacross; and drive means to translate the at least one cleaning sleeve along the exterior of the radiation source assembly.

BRIEF DESCRIPTION OF THE DRAWINGS

Embodiments of the present invention will be described with reference to the accompanying drawings, wherein like numerals designate like parts and in which:

FIGS. 3 and 4 illustrate side elevations, in partial cross-section, of a preferred embodiment of a fluid treatment device comprising a preferred embodiment of the present cleaning apparatus;

FIG. 5 illustrates an enlarged view, in cross-section, of area A in FIG. 4;

FIG. 6 illustrates a sectional view along line VI—VI in FIG. 5; and

FIG. 7 illustrates a sectional view along line VII—VII in FIG. 6.

BEST MODE FOR CARRYING OUT THE INVENTION

Prior to describing the preferred embodiments of the present invention, a brief discussion will be provided relating to conventional sealing arrangements used in cleaning devices.

Figure 1:
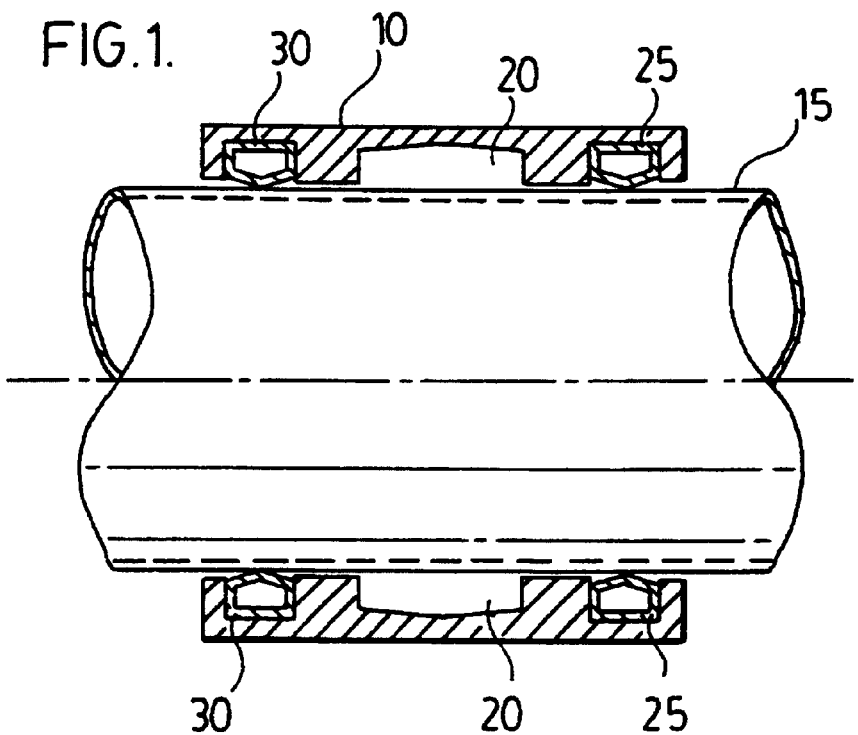
FIGS. 1 and 2 illustrate enlarged side elevations, in cross-section, of conventional sealing arrangements for a cleaning system used in a fluid treatment system.
Figure 2:
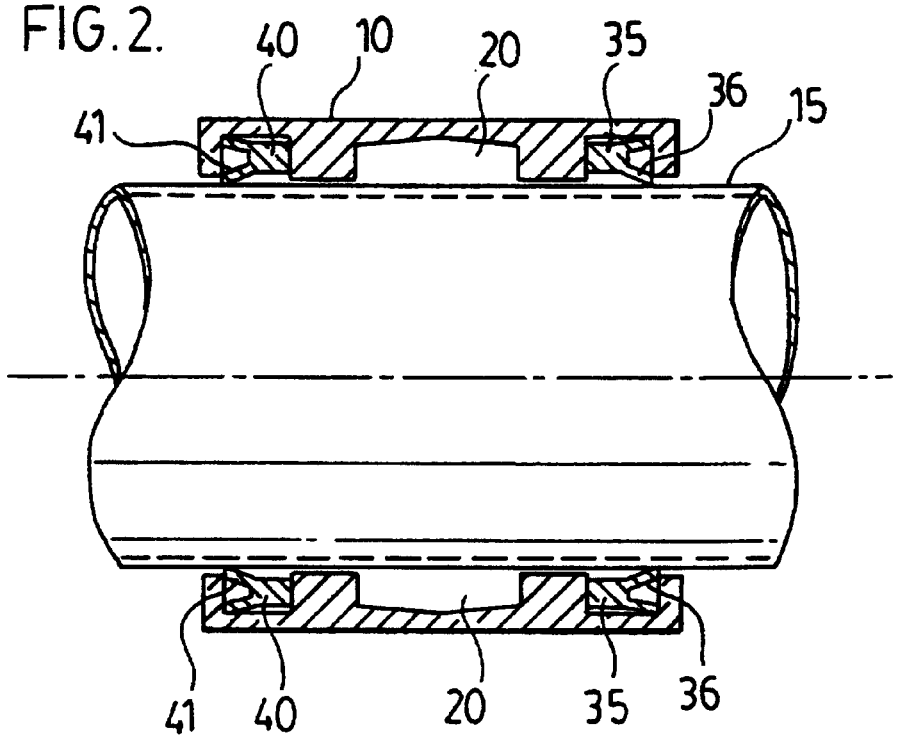

With reference to FIGS. 1 and 2 there is illustrated an enlarged sectional schematic view of a cleaning sleeve 10 engaged with the outside of a protective sleeve (typically made of quartz) 15 of a radiation source module (not shown). Cleaning sleeve 10 is slidably engaged with respect to protective sleeve 15—see the Maarschalkerweerd #2 Patents.

Cleaning sleeve 10 comprises a cleaning chamber 20 which may be filled with a cleaning fluid for removing fouling materials from the exterior of protective sleeve 15. Cleaning chamber 20 is sealed with respect with the exterior of cleaning sleeve 10. In FIG. 1, cleaning chamber 20 is sealed with respect to the exterior of cleaning sleeve 10 by a pair of O-rings 25,30. In FIG. 2, cleaning chamber 20 is sealed with respect to the exterior of cleaning sleeve 10 by a pair of U-cup seals 35,40. U-cup seals 35,40 each comprise a protective sleeve engaging lip 36,41, respectively.

When the cleaning sleeve illustrated in FIG. 1 is used, cleaning chamber 20 is filled with a suitable cleaning fluid and the cleaning sleeve may be actuated in a conventional manner—see, for example, the Maarschalkerweerd #2 Patents. As discussed above, if the pressure of the fluid outside cleaning sleeve 10 exceeds the pressure within cleaning chamber 20 by 5 psi or more, there is a significant risk that O-rings 25,30 will fail causing leakage of cleaning fluid from cleaning chamber 20 into the fluid being treated outside cleaning sleeve 10 or leakage into cleaning chamber 20 of the fluid being treated thereby diluting cleaning fluid in the latter. This is disadvantageous for the reasons set out above.

These problems may be overcome, in certain circumstances, by the use of U-cup seals 35,40 illustrated in FIG. 2. Specifically, when cleaning sleeve 10 in FIG. 2 is an operation in treatment of a fluid at a pressure which exceeds the pressure in cleaning chamber 20 by 5 psi or more, lips 36,41 are biased toward protective sleeve 15 to create a tighter seal than would be obtained with the sealing arrangement shown in FIG. 1. This may obviate or mitigate the leakage problem associated with the arrangement in FIG. 1. However, a further problem is created by the arrangement of FIG. 2. Specifically, since fluid being treated provides a continuous pressure gradient across U-cup seals 35,40 of 5 psi or more, the frictional forces which must be overcome to move cleaning sleeve 10 with respect to protective sleeve 15 are significantly increased when compared to the arrangement shown in FIG. 1. This causes a number of serious problems including; premature wearing out of U-cup seals 35,40, the need to utilize more powerful equipment to actuate cleaning sleeve 10, the increased likelihood that overcoming the frictional forces created by lips 36,41 will cause breakage of protective sleeve 15, and the like. These problems are exaserbated when the radiation source module in question comprises a plurality of protective sleeves 15 and cleaning sleeves 10, the latter being concurrently actuated when it is desired to clean the exterior of protective sleeve 15.

In summary, the prior art sealing arrangements either provide little resistance to cleaning solution leakage under pressurized conditions (FIG. 1) or provide so much resistance to leakage that a host of other problems which are potentially more serious are created (FIG. 2).

Preferred embodiments of the present invention will now be described with reference to FIGS. 3–7.

With reference to FIGS. 3 and 4, there is illustrated a fluid treatment device 100 comprising an inlet 105, an outlet 110 and a housing 115. A pair of opposed flanges 120,125 are disposed at opposite ends of housing 115. A pair of opposed cover plates 130,135 are attached to flanges 120,125, respectively, to provide, in the case of treating liquids, a fluid-tight seal.

Disposed in housing 115 is a radiation source assembly 140 comprising a pair of radiation sources, preferably ultraviolet radiation, lamps 145 disposed within a protective sleeve 150—e.g., a quartz sleeve.

Disposed adjacent cover plate 135 is a cleaning apparatus 200. Cleaning apparatus 200 comprises a pair of rods 205,210 which are slidably moveable through cover plate 135. Attached to the ends of rods 205,210 is a cleaning sleeve 300, the details of which will be described below. Attached to the other ends of rods 205,210 is a plate 215 which is connected to a slide 219 movable along a rail 220. Rail 220 is a conventional electric screw drive which is connected to an electric motor (not shown) or other electric motive means. The electric motor serves to rotate the screw (not shown) which translates slide 219 along rail 220 thereby moving plate 215.

With reference to FIGS. 5–7, a more detailed explanation of the design of cleaning sleeve 300 will be provided. Thus, cleaning sleeve 300 comprises a sleeve element 305 which surrounds and is movable over protective sleeve 150 of radiation source assembly 140 (see FIGS. 3 and 4). Sleeve element 305 includes a chamber 310 for receiving a cleaning fluid—in FIGS. 5–7, the cleaning fluid is shown in solid black. Cleaning chamber 310 is coupled to rods 205,210 and, ultimately, to plate 215 (FIGS. 3 and 4) in a conventional manner. Rod 210 is connected to a supply of cleaning fluid (not shown) which may be fed to cleaning chamber 310. Rod 205 may be used to drain cleaning fluid from cleaning chamber 210. The cleaning fluid may be acetic acid or any suitable fluid which will facilitate removal of fouling materials (e.g., minerals, algae and the like) from the surface of protective sleeve 150. In essence, cleaning chamber 310 is defined by a pair of annular seals 330,335 which, when sleeve 300 is mounted on quartz sleeve 150, form a substantially fluid-tight type seal. Seals 330,335 are preferably conventional O-rings or the like. Substantially adjacent seals 330,335 are a pair of Teflon™ bearings 340,345, respectively.

Also disposed in sleeve element 305 is an opening 350. Disposed in opening 350 is a flexible member 355. Flexible member 355 is held in place by a cap 360 mounted to cleaning sleeve 300 by screws 360,365 cap 360 is designed to have an opening 370. The combination of cap 360 and flexible member 355 forms a chamber 375 in communication with opening 370 to the exterior of sleeve element 305.

The choice of flexible element 355 is not particular restricted. Generally, this element should be chosen so that it forms a fluid type seal when cap 360 is screwed in to place. Also, flexible member 355 should be chosen so that it is movable in response to the creation of a pressure gradient across it. Practically, it is preferred to use a flexible polymer such as EPDM (ethylene-propylene-diene monomer terpolymer). Of course other elastomers, plastics and non-polymeric materials may be used provided they are movable in response to the creation of the pressure gradient referred to above.

In operation, when it is desired to clean the exterior of protective sleeve 150, the electrically driven screw (not shown) in rail 220 is actuated thereby moving plate 215 with respect to rail 220. This results in movement of cleaning sleeve 300 over protective sleeve 150. Such cleaning can be done while fluid treatment device 100 is in operation or while it has been shut down for maintenance or another reason. Further, it is possible to design the dimensions of housing 115 such that cleaning sleeve 300 may be parked in a position in housing 115 such that it does not interfere with the hydraulic flow of fluid through the device. As will be apparent to those with skill in the art, FIG. 3 shows cleaning sleeve 305 in the fully extended (i.e., into housing 115) position whereas FIG. 4 illustrates cleaning sleeve 305 adjacent a retracted (parked) position.

When first using fluid treatment device 100, the cleaning fluid in cleaning chamber 310 typically would be at a pressure different than the pressure of the fluid being treated. Thus, a pressure gradient is created across flexible member 355. In response to this pressure gradient, flexible member 355 will move (typically in a direction away from the applied pressure, typically a small distance). This movement of flexible member 355 causes an increase in the pressure in cleaning chamber 310 with the result that the pressure inside cleaning chamber 310 starts to equilibrate with the pressure of the fluid outside cleaning sleeve 300. This move toward pressure equilibrium across flexible member 355 obviates or mitigates failure of seals 330,335. Thus, illustrated cleaning sleeve 300 can be constructed using conventional O-ring type seals 330,335 while obviating or mitigating failure of both seals as discussed above with respect to FIG. 1. This, of course, also obviates or mitigates the problems associated with the sealing arrangement of FIG. 2 described hereinabove.

While the present invention has been described with reference to preferred and specifically illustrated embodiments, it will of course be understood by those of skill in the arts that various modifications to these preferred and illustrated embodiments may be made without the parting from the spirit and scope of the invention.

For example, it is possible to design sleeve element 305 such that it as a sealed cleaning chamber which is not connected directly to a supply of cleaning fluid. In this case, sleeve element 305 would be suitably modified to include an injection port for injection of cleaning fluid at periodic intervals. Further, while the illustrated embodiments relate to a closed fluid treatment system, the present cleaning apparatus may be utilized in an open fluid treatment system such as the one illustrated in the Maarschalkerweerd #1 Patents or in a combined opened/closed fluid treatment system as illustrated in the Maarschalkerweerd #2 Patents referred to hereinabove. Still further, it is possible to use a moveable piston which moves toward or away from the cleaning chamber depending on the nature (e.g., direction) of the pressure gradient. Other modifications to the illustrated embodiments will be apparent to those of skill in the art.

All publications, patents and patent applications referred to herein are incorporated by reference in their entirety to the same extent as if each individual publication, patent or patent application was specifically and individually indicated to be incorporated by reference in its entirety.

What is claimed is:

1. A cleaning apparatus for use in a fluid treatment system comprising a radiation source assembly, the cleaning apparatus comprising:

at least one cleaning sleeve in sliding engagement with the exterior of the radiation source assembly;

a cleaning chamber disposed in the at least one cleaning sleeve in contact with a portion of the exterior of the radiation source assembly and for being supplied with a cleaning solution, the cleaning chamber comprising an opening to an exterior of the cleaning sleeve;

a pressure equalization member disposed in the opening to provide a seal between the opening and the exterior of the cleaning sleeve, the pressure equalization member being moveable independently of the cleaning sleeve in response to a pressure gradient thereacross; and drive means to translate the at least one cleaning sleeve along the exterior of the radiation source assembly.

2. The cleaning apparatus defined in claim 1, wherein the pressure equalization member is flexible.

3. The cleaning apparatus defined in claim 2, wherein the pressure equalization member is made from a polymer.

4. The cleaning apparatus defined in claim 2, wherein the pressure equalization member is made from an elastomer.

5. The cleaning apparatus defined in claim 1, wherein the pressure equalization member comprises a relatively thin portion which is moveable in response to a pressure gradient thereacross.

6. The cleaning apparatus defined in claim 1, wherein the cleaning sleeve further comprises a supplementary chamber, a surface of which is defined by at least a portion of the pressure equalization member, the supplementary chamber having an opening therein to an exterior of the cleaning sleeve.

7. The cleaning apparatus defined in claim 1, further comprising supply means to supply cleaning fluid to the cleaning chamber.

8. The cleaning apparatus defined in claim 7, wherein the supply means allows for continuous supply of cleaning fluid to the cleaning chamber.

9. The cleaning apparatus defined in claim 7, wherein the supply means allows for periodic supply of cleaning fluid to the cleaning chamber.

10. The cleaning apparatus defined in claim 9, wherein the radiation source assembly comprises at least one radiation source disposed in a protective sleeve.

11. The cleaning apparatus defined in claim 10, wherein the protective sleeve comprises a quartz sleeve.

12. A fluid treatment device comprising a housing for receiving a flow of fluid, the housing comprising:
- a fluid inlet;
- a fluid outlet;
- a fluid treatment zone disposed between the fluid inlet and the fluid outlet;
- a radiation source assembly disposed in the fluid treatment zone for treatment of the flow of fluid; and
- a cleaning apparatus comprising: at least one cleaning sleeve in sliding engagement with the exterior of the radiation source assembly; a cleaning chamber disposed in the at least one cleaning sleeve in contact with a portion of the exterior of the radiation source assembly and for being supplied with a cleaning solution, the cleaning chamber comprising an opening to an exterior of the cleaning sleeve; a pressure equalization member disposed in the opening to provide a seal between the opening and the exterior of the cleaning sleeve, the pressure equalization member being moveable independently of the cleaning sleeve in response to a pressure gradient thereacross; and drive means to translate the at least one cleaning sleeve along the exterior of the radiation source assembly.

13. The fluid treatment device defined in claim 12, wherein the pressure equalization member is flexible.

14. The fluid treatment device defined in claim 13, wherein the pressure equalization member is made from a polymer.

15. The fluid treatment device defined in claim 13, wherein the pressure equalization member is made from an elastomer.

16. The fluid treatment defined in claim 12, wherein the pressure equalization member comprises a relatively thin portion which is moveable in response to a pressure gradient thereacross.

17. The fluid treatment device defined in claim 12, wherein the cleaning sleeve further comprises a supplementary chamber, a surface of which is defined by at least a portion of the pressure equalization member, the supplementary chamber having an opening therein to an exterior of the cleaning sleeve.

18. The fluid treatment device defined in claim 12, further comprising supply means to supply cleaning fluid to the cleaning chamber.

19. The fluid treatment device defined in claim 18, wherein the supply means allows for continuous supply of cleaning fluid to the cleaning chamber.

20. The fluid treatment device defined in claim 18, wherein the supply means allows for periodic supply of cleaning fluid to the cleaning chamber.

21. The fluid treatment device defined in claim 12, wherein the radiation source assembly comprises at least one radiation source disposed in a protective sleeve.

22. The fluid treatment device defined in claim 21, wherein the protective sleeve comprises a quartz sleeve.

23. The fluid treatment device defined in claim 12, wherein the fluid treatment zone comprises a substantially elongate irradiation zone.

24. The fluid treatment device defined in claim 12, wherein the at least one radiation source is substantially elongate.

25. The fluid treatment device defined in claim 12, wherein the at least one radiation source is disposed substantially parallel to a flow of fluid through the irradiation zone.

26. The fluid treatment device defined in claim 12, wherein the at least one radiation source is disposed substantially transverse to a flow of fluid through the irradiation zone.

27. The fluid treatment device defined in claim 12, wherein the fluid inlet, the fluid outlet and the fluid treatment zone are arranged in a substantially collinear manner.

28. The fluid treatment device in claim 12, wherein the fluid inlet, the fluid outlet and the fluid treatment zone are arranged in a substantially non-collinear manner.

29. The fluid treatment device defined in claim 12, wherein the fluid inlet, the fluid outlet and the fluid treatment zone have substantially the same cross-section.

* * * * *